United States Patent
Goodspeed et al.

[15] 3,650,793
[45] Mar. 21, 1972

[54] TITANIUM DIOXIDE OF IMPROVED CHALK RESISTANCE

[72] Inventors: Neil C. Goodspeed, Wadsworth, Ohio; Albert Dietz, New Martinsville, W. Va.; Russel R. May, Jr., Wadsworth, Ohio

[73] Assignee: PPG Industries, Inc., Pittsburgh, Pa.

[22] Filed: Feb. 28, 1969

[21] Appl. No.: 803,447

[52] U.S. Cl. ............................................106/300, 106/308 B
[51] Int. Cl. .............................................................C09c 1/36
[58] Field of Search .......................................106/300, 308 I

[56] References Cited

UNITED STATES PATENTS 3,203,818  8/1965  Rechmann et al. .....................106/300

FOREIGN PATENTS OR APPLICATIONS 1,008,652  10/1965  Great Britain ........................106/300
1,034,345  1/1966   Great Britain ........................106/300
1,118,264  6/1968   Great Britain ........................106/300

Primary Examiner—James E. Poer
Assistant Examiner—H. M. S. Sneed
Attorney—Chisholm and Spencer

[57] ABSTRACT

Pigmentary titanium dioxide having a metal oxide coating, e.g., zinc oxide, is heat treated and then given a separate hydrous metal oxide coating, e.g., an alumina and silica coating. The resulting pigment has good chalk resistance and good retention of optical properties such as gloss, color and tint efficiency.

17 Claims, No Drawings

3,650,793

TITANIUM DIOXIDE OF IMPROVED CHALK RESISTANCE

BACKGROUND OF THE INVENTION

Paint and lacquer films that are pigmented with regular (unmodified) titanium dioxide alone usually exhibit a type of failure known as "chalking" in outdoor service, i.e., the film surface tends to disintegrate to a powdery chalk. This type of failure takes place continuously at the surface of the film and eventually results in total destruction of the film. Such failure is caused, in part, by the pigment which, consequently, is said to possess poor chalk resistance.

Although many theories have been suggested to explain this type of disintegration, the exact mechanism by which such failure occurs is not known for certain. Since this type of disintegration occurs only on outdoor exposure of the film, the theory advanced most often for the poor weatherability of films pigmented with titanium dioxide is the action of sunlight on the pigment.

There have been methods proposed for producing titanium dioxide pigments that are resistant to outdoor weathering. One such method is to incorporate small amounts of conditioning agents, such as antimony trioxide, zinc oxide and rare earth compounds, with the titanium oxide hydrolysate before calcination. Another proposed method is to coat the individual particles of titanium dioxide after calcination with small amounts of one or more hydrous oxides of such metals as aluminum, chromium, silicon, titanium, tin, thorium, cerium, zinc and zirconium. Such treatments often increase the pigment's resistance to chalking, discoloration and fading to an appreciable extent but in some cases at sacrificing pigment color, brightness, tint efficiency and tinting strength.

Although the above-suggested methods result in some improvement in the outdoor weathering properties of titanium dioxide, there is a need for further improvement.

SUMMARY OF THE INVENTION

It has now been discovered that titanium dioxide having improved outdoor weathering properties, e.g., chalk resistance and gloss retention, can be produced by a combination of physical and chemical treatments. More particularly, such treatments comprise mildly heating pigmentary titanium dioxide having metal oxide coating selected from the group consisting of zinc oxide, zirconium oxide, and aluminum oxide on the surface thereof at temperatures of from about 500° C. to about 750° C. and thereafter superimposing a coating on the thus heated titanium dioxide of at least one hydrous metal oxide selected from the hydrous metal oxides of aluminum, silicon, zirconium and titanium.

DETAILED DESCRIPTION

Titanium dioxide pigment is produced commercially by at least two different manufacturing processes. One such process is known as the "sulfate or acid" process. In the sulfate process, a titaniferous ore, such as ilmenite, is digested with sulfuric acid to form a digest cake. The cake is dissolved in an aqueous medium to form a sulfate solution which, after clarification and concentration, is hydrolyzed to precipitate an insoluble titanium oxide hydrolysate. The hydrolysate is filtered, washed and calcined at temperatures ranging between 800° C. and 1,200° C. or higher to develop the pigmentary properties of the pigment. Such pigment is often referred to as "sulfate pigment" or "calcined titanium dioxide." The aforementioned calcination if performed on the titanium oxide hydrolysate to develop the pigmentary properties of the resulting titanium dioxide. The calcination can be conducted with or without additives, such as compounds of zinc. The additives are utilized to reduce the effective calcination temperature and to promote the development of the rutile crystalline form. See, for example, U.S. Pat. Nos. 2,253,551, 3,062,673 and 3,330,798.

Another and more recent process developed for preparing pigmentary titanium dioxide is that of the vapor phase reaction of a titanium halide, such as titanium tetrahalide. Typically, this method involves reacting vaporous titanium halide, e.g., titanium trichloride or titanium tetrachloride, with oxygen and/or water vapor in a reaction zone at elevated temperatures. For the oxidation reaction, reaction temperatures usually range between about 800° C. and about 1,200° C. Vapor phase hydrolysis temperatures usually range from 300° to 400° C. Pigment prepared by the aforementioned processes is often referred to as "chloride process pigment." The aforementioned vapor phase oxidation process is suitably described in U.S. Pat. Nos. 3,068,113 and 3,214,284, which are incorporated herein, in toto, by reference.

In the "chloride process," metal and non-metal compounds such as aluminum compounds, zirconium compounds, silicon compounds and alkali metal and/or alkaline earth metal compounds are often added to the vapor phase reaction zone. The presence and co-reaction of such compounds aids in the production of titanium dioxide having excellent pigmentary properties. The particular compounds of aluminum, zirconium, silicon and the alkali and alkaline earth metals that can be used in the "chloride process" as well as their respective amounts are well known in the art. Reference is made to U.S. Pat. No. 3,214,284, which has been incorporated herein, as an example of the state of the art.

The method of the present invention is especially applicable to pigmentary titanium dioxide prepared by vapor phase reaction, e.g., oxidation, of titanium halide such as the tetrachloride, tetrabromide and tetraiodide, in the presence of aluminum and silicon compounds in quantities sufficient to provide from about 1 to about 2.5 weight percent, preferably from about 1.5 to about 2.0 weight percent co-reacted alumina and from about 0.1 to about 1.0 weight percent, preferably from about 0.3 to about 0.75 weight percent silica. The aforementioned quantities of co-burned or co-oxidized alumina and silica are calculated as $Al_2O_3$ and $SiO_2$ respectively based on the quantity of $TiO_2$ produced.

Many of the pigmentary properties of "chloride process pigment," e.g., color, are superior to those of "calcined titanium dioxide," i.e., sulfate pigment, that has been calcined to develop its pigmentary properties. However, for the purpose of the present invention, both will be considered equivalent and referred to as "raw pigmentary titanium dioxide."

The term "raw pigmentary titanium dioxide" is intended to mean and include pigmentary titanium dioxide, especially rutile titanium dioxide, that has had its basic pigmentary properties developed. Such a pigment includes "chloride process titanium dioxide" and "calcined titanium dioxide" produced by the sulfate process, as well as equivalent titanium dioxide produced by other less common techniques. Also included within the term "raw titanium dioxide pigment" are the aforementioned pigments which have been physically treated, for example, by milling, grinding, hydroseparation, filtration and degassing procedures.

"Raw pigmentary titanium dioxide" is to be distinguished from a "finished" titanium dioxide pigment which is defined herein as a raw pigment which has been given one of more inorganic and/or organic coatings. Thus, a raw pigment is one which has had the basic chemical composition of its surface substantially unaltered once its basic pigmentary properties have been developed; whereas, a "finished" pigment is a pigment which has had the chemical composition of its surface altered by the addition of a chemical coating to the surface of the pigment. An example of one such coating technique is found in U.S. Pat. No. 3,146,119.

The method of the present invention is particularly applicable to "raw pigmentary titanium dioxide." It is also applicable to a "finished" titanium dioxide pigment but, for economic reasons, the use of raw pigment is preferred.

In accordance with the present invention, pigmentary titanium dioxide on which has been placed a coating of at least one metal oxide, such as zirconium oxide, is mildly heated at temperatures of from about 500° C. to about 750° C. and, thereafter, the resulting pigment is coated with at least one hydrous metal oxide of metals selected from the group consisting of aluminum, silicon, zirconium and titanium.

Metal oxides that are especially useful for coating the pigment prior to heating at from 500° to 750° C. in accordance with the present invention are the oxides of zinc, aluminum and zirconium. The oxide of zirconium has been found to be especially useful. The metal oxide applied to the surface of the pigment in the first step of the present method can be the oxide, per se, the hydrated oxide or mixtures thereof. As used herein, the terms "metal oxide" and "hydrous metal oxide" are each intended to include mixtures of the oxide and hydrated oxide.

The amount of metal oxide, calculated as the oxide of the particular metal in its principal valence state, (i.e., $ZnO$, $ZrO_2$ and $Al_2O_3$), used to coat the titanium dioxide pigment is at least about 0.05 weight percent, based on titanium dioxide and is usually at least about 0.1 weight percent. Typically, from about 0.1 to about 5 weight percent is used. Advantageously, an amount sufficient to coat the entire surface of the pigment is used. Amounts greater than 5 weight percent can be used; but, such amounts are considered not to be economically advantageous.

The aforementioned metal oxide coating can be placed on the titanium dioxide pigment in any suitable manner. Three such methods include: (a) physically blending the metal oxide with titanium dioxide; (b) precipitating a hydrous metal oxide of the desired metal on the pigment surface followed by drying the pigment; and (c) adsorbing a suitable metal compound, such as a halide of the desired metal, on the surface of the pigment and oxidizing or hydrolyzing the compound to its corresponding oxide or hydrate. The particular manner of application of the coating is not critical to the performance of the invention described herein.

An economical and preferred method for applying the first metal oxide coating to the titanium dioxide pigment is by physically blending the dry metal oxide with pigmentary titanium dioxide. Such blending can be easily accomplished in any commercial type of blender, e.g., a ball mill, micropulverizer, fluid energy mill, ribbon blender and twin shell blender. Care should be observed in the blending operation to prevent the incorporation of color-forming impurities from the blender into the blended mixture.

The procedure for placing a hydrous metal oxide coating on the titanium dioxide pigment is the conventional procedure used in the titanium dioxide pigment industry. In such method, the titanium dioxide pigment to be coated is slurried in water, which is usually distilled or deionized water, to a solids concentration of from about 10 to about 30 weight percent, typically about 20 weight percent. The slurry is then hydroclassified, such as by a Dorrclone, to produce an aqueous pigment slurry of a more desired pigmentary size distribution. A hydrolyzable compound(s) of the selected metal is then added to the resulting aqueous pigment slurry in an amount calculated to yield the desired amount of hydrous metal oxide. Thereafter, the hydrolyzable compound(s) is hydrolyzed and the hydrous metal oxide coated pigment flocculated by the addition of an alkaline or acid reacting reagent, depending on the pH of the slurry. Subsequently, the aqueous slurry is filtered, washed with deionized or distilled water to a preselected specific resistance and the resulting filter cake dried.

A third method that can be employed to coat the titanium dioxide pigment with metal oxide is to hydrolyze or oxidize an oxidizable or hydrolyzable compound of the desired metal while said compound is present on the surface of the pigment. For example, compounds such as the halides of the aforementioned metals, e.g., aluminum chloride, zinc chloride, and zirconyl chloride, can be placed on the pigment in any suitable manner, such as by spraying the metal salt onto the pigment, slurrying the pigment in a solution of the metal salt or by contacting the pigment with vapors of the metal salt. Oxidation of the metal compound adsorbed on the surface of the pigment can be accomplished in any suitable piece of equipment, such as a hearth, single or multiple, furnace, rotary calciner, fluid bed or the like. Such oxidation can be performed with the use of air, oxygen-enriched air, or oxygen-containing gas, such as pure oxygen. Similarly, hydrolysis of the metal compound adsorbed on the surface of the pigment can be conducted in any suitable piece of equipment such as a fluid energy mill, fluid bed and cylindrical reactor. Hydrolysis can be performed with water vapor, steam, superheated steam or combustion gases containing water, e.g., by combustion of a hydrogen-containing fuel such as hydrogen or a hydrocarbon. The temperature of hydrolysis or oxidation will typically depend on the temperature at which the selected metal compound oxidizes or hydrolyzes. Generally, metal compounds should be chosen that will hydrolyze or oxidize at temperatures less than about 750° C. in order to avoid unnecessary degradation of the properties of the basic pigment.

Although only the halides of the metals, e.g., chlorides, bromides, iodides and fluorides, have been mentioned, other suitable oxidizable or hydrolyzable metal salts, both organic and inorganic, such as the sulfates and phosphates, and the salts of such organic acids, such as formic acid, acetic acid, and naphthenic acid, are contemplated. The exact nature of the oxidizable or hydrolyzable metal salt is not critical to the practice of the present invention, and thus any metal compound which will form the oxide or hydrate of the metal under the aforementioned conditions can be used.

Following application of the desired metal oxide to the surface of the pigmentary titanium dioxide, the thus coated pigment is heated at temperatures of from about 500° C. to about 750° C. and more preferably at from 550° C. to about 700° C. Most preferably, the pigment is heated at temperatures of from about 600° C. to about 650° C. The use of temperatures below about 500° C. results in a pigment of poor photolytic stability. The use of temperatures greater than 750° C. results in a degradation of the color of the pigment and poor photolytic stability. The above-recited range of 500° to 750° C. is to be distinguished from temperatures at which titanium dioxide pigment is dried and temperatures at which the pigment is calcined. Typical temperatures at which titanium dioxide is dried to avoid degradation of the pigment range from about 60° C. to about 300° C. and usually range between 100° and 220° C. Calcination temperatures typically range from about 800° C. to about 1,200° C. and most commonly range from about 900° C. to about 1,000° C.

The metal oxide coated pigment is heated at the aforesaid temperatures for a time sufficient to improve the resulting photolytic stability of the pigment and the pigment's durability, i.e., resistance to outdoor weathering. Generally, the higher the heating temperature, the shorter the heating time required to obtain improved photolytic stability and vice versa. Contemplated are heating periods of from about 10 minutes to about 5 hours at temperatures of from 750° C. to about 500° C. respectively. Typically, heating is conducted for from about 10 minutes to about 120 minutes, preferably from about 20 to about 30 minutes at temperatures from about 600° to 650° C. Times of less than 10 minutes are usually inadequate to assure that all of the pigment is heat treated whereas heating periods of greater than 120 minutes, e.g., 5 hours, have not resulted in any apparent improvements in photolytic stability over shorter heating periods at such temperatures. Thus, while extended heating periods of greater than 120 minutes at temperatures less than 650° C. can be used, such heating times should be avoided at temperatures of greater than about 700° C. in order to avoid degradation of the pigment's properties.

Following heat treatment, it has been found expedient to mill the heat treated pigment, e.g., by fluid energy milling, to break up any pigment agglomeration that has resulted from the heat treatment and to obtain optimum dispersion in the aqueous slurry prepared with the heat treated pigment.

The aforementioned heat treatment can be performed as a separate process step after the application of the initial metal oxide coating described herein; or, it can be performed substantially simultaneously to said coating operation. Thus, physical blending of a selected metal oxide, such as zinc oxide, with titanium dioxide can be performed in a region of a calciner or furnace which is held at temperatures of less than 500° C. Similarly, the oxidation or hydrolysis of a metal compound on the surface of the pigment can be followed immediately by the heat treatment in a heat soaking zone of the particular equipment used.

The heat treated pigment is then coated with a top layer or second coating of at least one hydrous metal oxide of metals selected from the group consisting of aluminum, silicon, zirconium and titanium. Usually, the hydrous metal oxide is directly above the heat treated metal oxide coating. Particularly contemplated are coatings of hydrous alumina alone, hydrous silica alone, hydrous zirconia and silica, hydrous silica and alumina, and hydrous alumina, silica and titania. A combined coating of hydrous silica and alumina is preferred. Following application of the second hydrous metal oxide coating to the pigment, the pigment is filtered, washed, dried and fluid energy milled. The procedure for the above-mentioned coating technique is art-recognized and is adequately described in publications and issued U.S. patents. Reference is made to U.S. Pat. No. 3,146,119 and copending United States application, Ser. No. 691,931, now U.S. Pat. No. 3,510,334 which are incorporated herein, in toto, by reference to illustrate the aforementioned coating technique. Only so much of said technique as is necessary for the understanding of the present method without reference to the aforementioned patent and patent application, therefore, will be incorporated herein. Other details can be found by reference to the aforementioned patent and patent application.

Typically, the coating procedure is performed in an aqueous medium at temperatures of between about 30° C. and about 100° C. and comprises adding hydrolyzable compounds of silicon, aluminum, zirconium and titanium that yield silica, alumina, zirconia and titania hydrates, respectively, upon hydrolysis to an aqueous slurry of the titanium dioxide pigment. The aqueous slurry typically comprises between about 10 and about 30 weight percent titanium dioxide and usually comprises about 20 weight percent titanium dioxide.

The water in which the pigment is slurried should be such so as not to incorporate harmful contaminants into the pigment, i.e., the water should be relatively pure, e.g., deionized or distilled water.

The hydrolyzable metal salts of aluminum, silicon, zirconium and/or titanium are added to the slurry and hydrolyzed, if necessary, by the addition of a suitable neutralizing agent, i.e., an acid or base, depending on the pH of the slurry and the conditions under which said metal salts hydrolyze completely. If the slurry pH is alkaline, the slurry pH can be adjusted with an acidic agent, such as an inorganic acid (HCl, $H_2SO_4$, $H_3PO_4$, etc.) or acid yielding metal salts such as titanium tetrachloride and aluminum sulfate. If the slurry pH is acidic, the pH of the slurry can be adjusted with an alkaline agent. Any conventional alkaline agent utilized in the pigment industry can be used. Preferably, the alkaline material forms a halogen salt which is soluble in the liquid medium used to wash the flocculated pigment and/or volatile under the conditions at which the pigment is dried. Typical of the alkaline agents that can be used, alone or in any combination, include sodium hydroxide, potassium hydroxide, lithium hydroxide, ammonium hydroxide, gaseous ammonia, potassium carbonate, sodium carbonate, potassium bicarbonate and sodium bicarbonate.

After the addition and hydrolysis of the desired hydrolyzable metal compound(s), the pH of the pigment slurry is further adjusted, if necessary, to a level at which the pigment, now coated with hydrous metal oxides, flocculates, i.e., between about 5 and about 8, usually about 7.

The slurry typically is maintained at a temperature of from about 30° C. to about 100° C., preferably 60° to 85° C., for a period ranging from about 5 minutes to about 20 hours, preferably from 1 to 3 hours, so as to digest the slurry and insure proper setting of the hydrous metal oxide on the surface of the pigment. Such digestion can be conducted after hydrolysis of the metal salts and/or after the slurry is brought into the floc-forming range. The slurry, following such digestion, should have a substantially neutral pH, i.e., from about 6.5 to about 7.5. The need for a pigment with a pH near neutral is necessitated by the commercial requirement that the finished pigment have a pH of approximately neutral so that it does not react with any oleoresinous vehicle into which it is incorporated.

Precipitation of more than one hydrous metal oxide onto the surface of the titanium dioxide pigment can be performed simultaneously or in any desired sequence. Additional layers of hydrous metal oxide can be applied to the pigment by repeating the aforementioned procedure, i.e., reslurrying of the pigment, if necessary, addition of hydrolyzable metal salts to the slurry, hydrolysis thereof, adjustment of the slurry pH and digestion.

The aqueous slurry containing the coated, flocculated pigment is then filtered, washed to remove impurities such as salts of hydrolysis, dried and ground in a mill, e.g., a fluid energy mill such as a micronizer.

Titanium compounds that can be used to coat the $TiO_2$ pigment in accordance with the present process are water soluble compounds of titanium from which, upon hydrolysis, there can be precipitated titanium oxide, a titania hydrate, e.g., $Ti(OH)_4$, $TiO_2 \cdot xH_2O$, $TiO(OH)_2$, or a titanium hydrate condensate, e.g.,

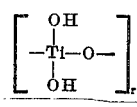

wherein $r$ is at least 2, or mixtures thereof. Examples of suitable titanium compounds include: titanium tetrachloride, titanium tetraiodide, titanium tetrabromide, titanium sulfate, titanyl sulfate, titanium esters, such as tetraethyl titanate, tetra-2-chloroethyl titanate, tetraphenoxy titanium and alkali metal titanates, e.g., lithium, sodium and potassium titanates. Likewise, tetra-acyloxy titanium, for example, tetra-acetyl titanium and tetrabutyric titanium can be employed. Titanium tetrachloride is economically preferred.

Aluminum compounds that can be used to coat the $TiO_2$ pigment in accordance with the present process are water soluble compounds of aluminum from which, upon hydrolysis, there can be precipitated $Al(OH)_3$, an alumina hydrate, or an aluminum hydrate condensate, e.g.,

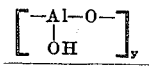

wherein $y$ is at least 2, or mixtures thereof. Aluminum condensates include low molecular weight $Al_2O_3$ containing hydroxyl groups. Such condensates can be characterized as a low molecular weight aluminoxy polymer having the repeating unit:

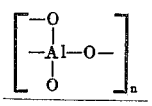

wherein $n$ generally has a value of 2 or more. The free valences of the repeating unit are attached to hydrogen, alkoxy, aryloxy, acyloxy, $Al(OH)_2$ radicals or cross-linked with other materials of the same unit formula.

Examples of suitable aluminum compounds include: aluminum chloride, aluminum bromide, aluminum sulfate, alkyl and aryl aluminum such as triethyl aluminum, trihexyl aluminum and triphenyl aluminum. Likewise, alkoxy and aryloxy aluminum such as triethoxy aluminum, tributoxy aluminum and triphenoxy aluminum can be employed. Acyloxy aluminum such as triacetyl aluminum can also be used. Aluminum chloride and aluminum sulfate are preferred.

Silicon compounds that can be used to coat the $TiO_2$ pigment in accordance with the present process are water soluble compounds of silicon from which there can be precipitated a silica hydrate, e.g., $Si(OH)_4$, $SiO_2 \cdot xH_2O$, $SiO_y \cdot xH_2O$, $SiO(OH)_2$, silicon oxide, a silicon hydrate condensate, e.g.,

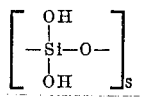

wherein $s$ has a value of at least 2, or mixtures thereof.

Examples of suitable silicon compounds include: silicic acid and alkali metal silicates, e.g., sodium and potassium silicate, $SiCl_4$, $SiBr_4$, $SiI_4$, $SiH_4$, $Si(OOCCH_3)_4$, $Si(OCH_3)_4$, $Si(NH_2)_2$, $Si(NH_2)_4$, $Si(OCH_2CH_3)_4$, or other such hydrolyzable silicon compounds. Preferably, the silicon compound is added to the pigment slurry in the form of an aqueous solution.

Zirconium compounds that can be used to coat the $TiO_2$ pigment in accordance with the present process are water soluble compounds of zirconium from which there can be precipitated a zirconia hydrate, e.g., $ZrO_2 \cdot xH_2O$, zirconium oxide or a zirconium hydrate condensate. Examples of suitable zirconium compounds include: zirconium sulfate, zirconyl chloride, zirconyl bromide, zirconyl iodide, zirconium fluoride and zirconyl nitrate.

The application of the hydrous titania, alumina, zirconia, and silica coatings can be chemically represented by the following unbalanced equations:

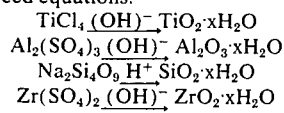

The titanium compound, preferably titanium tetrachloride, is added to the pigment slurry in an amount sufficient to coat the titanium dioxide pigment with from 0.05 to 10 percent, preferably 0.1 to 3 percent, by weight titania, calculated as $TiO_2$, based on the weight of the pigment.

The aluminum compound, preferably aluminum chloride or aluminum sulfate, is added to the pigment slurry in an amount sufficient to coat the titanium dioxide pigment with from 0.05 to 15 percent, preferably 0.5 to 5 percent, by weight alumina, calculated as $Al_2O_3$, based on the weight of the pigment.

The silicon compound, preferably silicic acid or sodium silicate, is added to the titanium dioxide pigment slurry in an amount sufficient to coat the titanium dioxide pigment with from 0.01 to 10 percent, preferably from 0.4 to 4 percent, by weight silica, calculated as $SiO_2$, based on the weight of the pigment.

The zirconium compound, preferably zirconium sulfate or zirconyl chloride, is added to the pigment slurry in an amount sufficient to coat the titanium dioxide pigment with from 0.05 to 15 percent, preferably 0.5 to 5 percent, by weight zirconia, calculated as $ZrO_2$, based on the weight of the pigment.

The above quantities of silicon, aluminum, zirconium and titanium compounds added to the pigment slurry are typical of those amounts conventionally used. Quantities greater or less than those recited can be employed. Of particular utility are coatings of hydrous alumina and hydrous silica wherein from about 1 to 3 weight percent of each, based on $TiO_2$, is used. Typically, the percentage ratio of hydrous alumina to hydrous silica (weight percent based on $TiO_2$) is 1:3 to 3:1. The total amount of superposed hydrous metal oxide coating placed on the titanium dioxide pigment typically ranges from about 2 to about 20 weight percent, preferably 3 to 15 weight percent, based on the weight of the pigment.

After filtering the pigment slurry, impurities such as salts are removed by washing of the filtered flocs with an extractant such as water, alcohols, ethers, ketones, or mixtures of the same.

After washing, the pigment is dried at temperatures of from 60° to 300° C., preferably 100° to 220° C., e.g., by means of an oven, belt dryer, or spray dryer, and then milled, e.g., in a fluid energy mill.

In a typical embodiment of the present invention, titanium dioxide prepared by vapor phase oxidation of titanium tetrachloride is blended with about 1 weight percent zirconium oxide, and heated in a rotary kiln at 650° C. for about 30 minutes. The resulting pigment is fluid energy milled and then slurried in deionized water to give a slurry of about 20 weight percent solids. The pH of the resulting slurry is adjusted to between about 9 and 10 and the slurry hydroclassified in a series of Dorrclone classifiers. Sodium silicate and aluminum sulfate solutions sufficient to yield, respectively, about 1 weight percent silica and about 2 weight percent alumina, based on $TiO_2$, are added to the overflow from the Dorrclone classifier and the resulting slurry heated from ambient temperature to about 85° C. The slurry is neutralized to a pH of about 7 with anhydrous ammonia and sodium carbonate and digested for about an hour at 85° C. The alumina-silica coated $TiO_2$ pigment containing an initial or lower layer of zirconium oxide is recovered by filtration. The filter cake is washed with deionized water, dried at about 110° C., and fluid energy milled.

Evaluation of the pigments produced in accordance with the process described herein, such as in the succeeding examples, can be performed utilizing conventional pigment tests as well as by outdoor exposure of paint panels prepared with such pigments.

The tinting strength and tint tone of pigments can be determined by means of A.S.T.M. Method D-332-26 which is found in the 1949 *Book of A.S.T.M. Standards*, published by the American Society for Testing Materials, Philadelphia 3, Pennsylvania.

The tint efficiency of a pigment, which is a measure of the ability of a white pigment to resist tinting by a colored pigment, can be determined by the reflectometry method described in A.S.T.M. Method D-2745-68T. This method was originally described by Mitton and Jacobsen in the *Journal of Paint Technology and Engineering*, (Official Digest, Vol. 34, pp. 704–715, July, 1962).

The percent gloss retained of an exposed paint panel can be measured by a Hunter Glossmeter. A procedure for this method is found in A.S.T.M. Method D-523-62T. A high gloss retention percentage is an indication of increased durability for a pigment.

Photoreactivity of the pigment can be determined by the use of the Mandelic Acid Test. This test depends on the photochemical reduction of titanium dioxide to a lower oxide with the simultaneous oxidation of a liquid medium such as aqueous solutions of stannous chloride, glycerol, aqueous solutions of mandelic acid, octyl alcohol, and mineral oil. Although glycerol produces the fastest reaction, mandelic acid is often employed because of operational advantages such as workability of the paste. This test method is described by A. E. Jacobsen in *Industrial Engineering Chemistry*, Vol. 41, p. 524, (1949).

Basically, this test comprises mulling about 10 grams of the sample pigment into a soft paste with the liquid medium, such as glycerol or a 0.5 molar solution of mandelic acid in water. The paste is placed on a glass plate 5×5×0.04 inches, covered by another plate of the same size and pressed out to a surface area of 4 inches in diameter. The edges of the plate are bound with ⅜-inch cellulose adhesive tape to prevent drying of the paste. An initial reflectance is made with a tristimulus reflectometer and recorded. For exposure, the glass slide of the sample pigment and a glass slide of a similarly prepared standard pigment are placed on the outer edge of a rotating table below a source of ultraviolet light such as a sunlamp. Additional readings are made at suitable intervals of time and the rate of discoloration of the experimental pigment relative to the standard determined. As a result of these readings, the experimental pigment is given a rating, based on the standard, of from 1 to 10. In this scale, 1 is the least photoreactive and 10 the most photoreactive. A pigment yielding a rating of from 1 to 3 is usually considered to have good resistance to photoreactivity.

Titanium dioxide is a well-known commercial white pigment and is used in the paint, coatings and paper industry.

The present process is more particularly described in the following examples which are intended as illustrative only since numerous modifications and variations therein will be apparent to those skilled in the art.

EXAMPLE I

Titanium dioxide prepared by vapor phase oxidation of titanium tetrachloride in the presence of aluminum chloride and silicon tetrachloride was processed further in accordance with the procedures set forth hereinafter. The base pigment had a tinting strength value of about 1,640, a tone of Brown −1, an oil absorption of about 19, and contained about 1.7 weight percent co-reacted alumina, and about 0.3 weight percent co-reacted silica, based on $TiO_2$.

Preparation A

To an aqueous slurry of the base pigment (about 20 weight percent solids) at ambient temperatures (about 25° C.) was added sufficient sodium silicate and aluminum sulphate to yield about 1.0 weight percent hydrous silica (calculated as $SiO_2$) and about 3.2 weight percent hydrous alumina (calculated as $Al_2O_3$) respectively, based on $TiO_2$. The resulting slurry was heated to about 85° C. and digested at that temperature for about 1 hour. Thereafter, the slurry was neutralized with anhydrous ammonia to a neutral pH and the slurry digested to insure proper setting of the hydrous silica and alumina coating. The coated pigment was recovered by filtration, washed with deionized water, dried at a temperature of about 110° C. and fluid energy milled in a Trost mill.

Preparation B

Base pigment was heat treated for about 1 hour at about 600° C. in a muffle furnace. The heat treated pigment was fluid energy milled in a Trost mill and then given the same hydrous oxide coating described in Preparation A.

Preparation C

To an aqueous slurry of the base pigment (about 20 weight percent solids) at ambient temperature was added sufficient zinc sulfate to yield about 1.0 weight percent hydrous zinc oxide (calculated as ZnO), based on $TiO_2$. The resulting slurry was heated to about 85° C. and digested for about 1 hour. The slurry was then neutralized with anhydrous ammonia to a neutral pH and the slurry filtered. The filter cake of zinc oxide coated $TiO_2$ was washed with deionized water and dried. The resulting pigment was heated for about 1 hour at about 600° C. in a muffle furnace. Following the heat treatment, the pigment was fluid energy milled in a Trost mill, slurried in water and given the same hydrous oxide coating described in Preparation A.

Preparation D

The procedure of Preparation C was followed except that the initial hydrous zinc oxide coating on the pigment was replaced with a 2.0 weight percent hydrous alumina coating. The hydrous alumina coating was obtained by introducing sufficient aluminum sulphate into the base pigment slurry to yield about 2.0 weight percent hydrous alumina (calculated as $Al_2O_3$) based on $TiO_2$.

Each of the aforementioned prepared pigments (Preparations A, B, C, and D) were tested for (1) photoreactivity by the mandelic acid test and (2) tint efficiency. Portions of the aforesaid pigments, as well as three commercially available titanium dioxide pigments, were each incorporated into a thermoset acrylic vehicle and a melamine alkyd vehicle.

Paint panels prepared with the thermoset acrylic vehicle composition were exposed at 5° horizontal, Florida, south for 18 months and the 20° and 60° gloss were measured by a Hunter Glossmeter at 12 and 18 months. Paint panels prepared from the melamine alkyd vehicle were exposed at 5° horizontal, Medina (Ohio) south for 24 months and the 20° gloss was measured by a Hunter Glossmeter. The results of the above tests are tabulated in Table I.

TABLE I

| Pigment preparation | Photo-reactivity, Mandelic acid test | Tint efficiency | Thermoset acrylic vehicle Florida exposure (Series 061), Gloss readings | | | | Melamine-Alkyd vehicle Ohio exposure (Series 062), Gloss readings |
|---|---|---|---|---|---|---|---|
| | | | 20° | | 60° | | 20° |
| | | | 12 mos. | 18 mos. | 12 mos. | 18 mos. | 24 months |
| A | 3 | 101 | 31 | 4 | 60 | 13 | 29 |
| B | 2 | 97 | 45 | 11 | 74 | 36 | 39 |
| C | 2 | 96 | 54 | 15 | 78 | 45 | 38 |
| D | 2 | 102 | 52 | 15 | 78 | 43 | 55 |
| Commercial pigment X [a] | | *92.5 | 19 | 1 | 49 | 11 | 46 |
| Commercial pigment Y [b] | | *87.5 | 17 | 2 | 55 | 21 | 34 |
| Commercial pigment Z [c] | | *87.5 | 22 | 2 | 58 | 22 | 34 |

[a] Automotive enamel grade pigment.
[b] Durable grade sulfate process $TiO_2$ pigment.
[c] Durable grade sulfate process $TiO_2$ pigment from a source different than (b).
*Average value for samples of the pigment.

The data of Table I show that paint panels prepared with pigment processed in accordance with the present invention (Preparations C and D) have a definite advantage in 20° and 60° gloss retention and tint efficiency for the vehicle systems tested when compared with two commercial durable grade sulfate process $TiO_2$ pigments.

EXAMPLE II

Titanium dioxide prepared by vapor phase oxidation of titanium tetrachloride in the presence of aluminum chloride and silicon tetrachloride was processed further in accordance with the procedures set forth hereinafter. The base pigment had a tinting strength value of about 1,680, a tone of Neutral, an oil absorption of about 18 and contained about 1.7 weight percent co-reacted alumina and about 0.3 weight percent co-reacted silica, both based on $TiO_2$.

Preparation A

To an aqueous slurry of the base pigment (about 20 weight percent solids) at ambient temperatures (about 25° C.) was added sufficient sodium silicate and aluminum sulfate to yield about 1.0 weight percent hydrous silica (calculated as $SiO_2$) and about 3.2 weight percent hydrous alumina (calculated as $Al_2O_3$) respectively, based on $TiO_2$. The resulting slurry was heated to about 85° C. and digested at that temperature for about 1 hour. Thereafter, the slurry was neutralized with anhydrous ammonia to a neutral pH and the slurry digested to insure proper setting of the hydrous silica and alumina coating. The coated pigment was recovered by filtration, washed with deionized water, dried at a temperature of about 110° C. and fluid energy milled in a Trost mill.

Preparation B

Base pigment was heat treated for about 1 hour at about 600° C. in a muffle furnace. The heat treated pigment was fluid energy milled in a Trost mill and then given the same hydrous oxide coating described in Preparation A.

Preparation C

To an aqueous slurry of the base pigment (about 20 weight percent solids) at ambient temperature was added sufficient zinc sulfate to yield about 1.0 weight percent hydrous zinc oxide (calculated as ZnO), based on $TiO_2$. The resulting slurry was heated to about 85° C. and digested for about 1 hour. The slurry was then neutralized with anhydrous ammonia to a neutral pH and the slurry filtered. The filter cake of zinc oxide coated $TiO_2$ was washed with deionized water and dried. The resulting pigment was heated for about 1 hour at about 600° C. in a muffle furnace. Following the heat treatment, the pigment was fluid energy milled in a Trost mill, slurried in water and given the same hydrous oxide coating described in Preparation A.

Each of the aforementioned prepared pigments (Preparations A, B, and C) was tested for (1) photoreactivity by the mandelic acid test and (2) tint efficiency. Portions of the aforesaid pigments, as well as the three commercial titanium dioxide pigments recited in Example I and Table I, were each incorporated into a thermoplastic acrylic vehicle and an air-dry alkyd vehicle.

Paint panels prepared with the thermoplastic acrylic vehicle were exposed at 5° horizontal, Medina (Ohio) south for 15 months and the 60° gloss was measured by a Hunter Glossmeter. Paint panels prepared from the air dry alkyd vehicle were exposed at 5° horizontal, Florida south and the 60° gloss was, after 18 months' exposure, measured. The results of the above tests are tabulated in Table II.

hour. The slurry was then neutralized with anhydrous ammonia to a neutral pH and the slurry filtered. The filter cake was washed with deionized water and dried. The resulting pigment was heated for about 1 hour at about 600° C. in a muffle furnace. Following heat treatment, the pigment was fluid energy milled in a Trost mill, slurried in water and given the same hydrous oxide coating described in Preparation A of Example I.

Preparation C

The procedure of Preparation B was repeated except that the initial hydrous alumina coating on the pigment was replaced with about a 1.0 weight percent hydrous zinc oxide coating. The hydrous zinc oxide coating was obtained by introducing sufficient zinc sulfate into the base pigment slurry to yield about 1.0 weight percent hydrous zinc oxide (calculated as ZnO) based on $TiO_2$.

Preparation D

The procedure of Preparation B was repeated except that the initial hydrous alumina coating on the pigment was replaced with about a 1.0 weight percent hydrous zirconia coating which was obtained by introducing sufficient zirconyl chloride into the base pigment slurry to yield about 1.0 weight percent hydrous zirconia (calculated as $ZrO_2$) based on $TiO_2$.

Pigments prepared in accordance with Preparations B, C, and D were tested for photoreactivity by the mandelic acid test. Portions of the pigments prepared in accordance with Preparations A, B, C, and D, as well as portions of three commercially available titanium dioxide pigments, were each incorporated into an air-dry alkyd vehicle. Paint panels prepared with the air-dry alkyl vehicle composition were exposed at 5° horizontal, Florida south. The 60° gloss retained by these panels after 8 months' exposure was read by a Hunter

TABLE II

| Pigment Preparation | Photo-reactivity, Mandelic acid test | Tint efficiency | Air-dry alkyd Florida exposure (Series 091) 60° Gloss readings 18 months | Thermoplastic acrylic Ohio exposure (Series 114) 60° Gloss readings 15 months |
| --- | --- | --- | --- | --- |
| A | 2 | 96 | 31 | 11 |
| B | 2 | 93 | 42 | 28 |
| C | 2 | 93 | 47 | 20 |
| Commercial pigment X [a] | | *92.5 | 25 | 43 |
| Commercial pigment Y [b] | | *87.5 | 20 | 33 |
| Commercial pigment Z [c] | | *87.5 | 19 | 25 |

[a] Automotive enamel grade pigment.
[b] Durable grade sulfate process $TiO_2$ pigment.
[c] Durable grade sulfate process $TiO_2$ pigment from a source different than (b).
*Average value for samples of the pigment.

The data of Table II show that the paint panel prepared with pigment processed in accordance with the present invention (Preparation C) has a definite advantage to the two durable grade pigments shown in tint efficiency and in 60° gloss retention in an air-dry alkyd vehicle.

EXAMPLE III

Titanium dioxide prepared by vapor phase oxidation of titanium tetrachloride in the presence of aluminum and silicon was processed further in accordance with the procedures set forth hereinafter. The base pigment's optical properties and co-reacted silica and alumina content were comparable to those recited for the base pigments of Examples I and II.

Preparation A

Base pigment was heat treated for about 1 hour at about 600° C. in a muffle furnace. The heat treated pigment was fluid energy milled in a Trost mill and then given a hydrous alumina-hydrous silica coating in the same manner as described in Preparation A of Example I.

Preparation B

To an aqueous slurry of the base pigment (about 20 weight percent solids) at ambient temperature was added sufficient aluminum sulfate to yield about 1.0 weight percent hydrous alumina (calculated as $Al_2O_3$) based on $TiO_2$. The resulting slurry was heated to about 85° C. and digested for about 1

Glossmeter. The results of the readings and above tests are tabulated in Table III.

EXAMPLE IV

Portions of the base pigment of Example III were physically blended with about 1.0 weight percent aluminum oxide (Preparation E), zinc oxide (Preparation F), and zirconium oxide (Preparation G). Each of the blends were heated in a muffle furnace at about 600° C. for about 1 hour and then fluid energy milled in a Trost mill. Each of the resulting pigments were slurried in water and given a hydrous alumina-hydrous silica coating in the same manner as described in Preparation A of Example I.

Pigments prepared in accordance with the above preparations were tested for photoreactivity by the mandelic acid test. Other portions thereof were incorporated into the air-dry alkyd vehicle system used in Example III and paint panels prepared therefrom exposed at 5° horizontal, Florida south. The 60° gloss retained by these panels after 8 months' exposure was read by a Hunter Glossmeter. The results of the readings and above tests are tabulated in Table III.

TABLE III

| Pigment Preparation | Photoreactivity Mandelic Acid Test | Air-dry Alkyd Vehicle Florida Exposure (Series 142) 60°-Gloss Readings 8 months |
|---|---|---|
| A | — | 36 |
| B | 2 | 35 |
| C | 2 | 41 |
| D | 2 | 44 |
| E | 2 | 41 |
| F | 2 | 36 |
| G | 3 | 38 |
| Commercial Pigment U[(a)] | — | 35 |
| Commercial Pigment V[(b)] | — | 22 |
| Commercial Pigment W[(c)] | — | 18 |

(a) durable grade chloride process TiO$_2$ (b) durable grade chloride process TiO$_2$ from a source other than (a)

(c) gloss enamel TiO$_2$ pigment

The results of Table III show that paint panels prepared with pigment processed in accordance with the present invention (Preparations B, C, D, E, F, and G) are equal or better in 60° gloss retention in the vehicle system tested than two commercial durable grade chloride process TiO$_2$ pigments.

While there are above described a number of specific embodiments of the present invention, it is obviously possible to produce other embodiments and various equivalent modifications thereof without departing from the spirit of the invention.

Having set forth the general nature and specific embodiments of the present invention, what is claimed is particularly pointed out in the appended claims.

We claim:

1. A method for improving the photolytic stability of pigmentary titanium dioxide, which comprises the steps of (a) coating pigmentary titanium dioxide with at least 0.05 weight percent zirconium oxide, (b) heating the zirconium oxide coated pigment at from about 500° C. to about 750° C. for from about 10 minutes to about 5 hours, and (c) coating the heat treated pigment with at least one member selected from the group consisting of the hydrous metal oxides of aluminum, silicon, zirconium and titanium.

2. A method according to claim 1 wherein the zirconium oxide coating applied in step (a) is present in amounts of from about 0.1 to about 5 weight percent.

3. A method according to claim 1 wherein said zirconium oxide coating is heated at from about 600° C. to about 650° C. for from about 20 to about 30 minutes.

4. A method according to claim 1 wherein the pigmentary titanium dioxide treated is prepared by vapor phase oxidation of titanium tetrachloride and contains from about 0.3 to about 0.75 weight percent co-reacted silica and from about 1 to about 2.5 weight percent co-reacted alumina.

5. A method according to claim 1 wherein the total amount of hydrous metal oxide coating placed on the pigment in step (c) is from about 2 to about 20 weight percent, based on titanium dioxide.

6. A method according to claim 5 wherein the hydrous metal oxide coating placed on the pigment in step (c) is hydrous alumina and hydrous silica in a weight percent ratio, based on titanium dioxide, of from 1:3 to 3:1.

7. A method for improving the photolytic stability of pigmentary titanium dioxide, which comprises the steps of (a) coating pigmentary titanium dioxide with at least 0.1 weight percent of zirconium oxide, (b) heating the zirconium oxide coated pigment at from about 600° C. to about 650° C. for from about 20 to about 30 minutes, and (c) coating the heat treated pigment with hydrous alumina and hydrous silica in a weight percent ratio, based on titanium dioxide, of from 1:3 to 3:1, the total amount of said coating ranging from 2 to about 20 weight percent based on the weight of titanium dioxide.

8. A method for improving the photolytic stability of pigmentary titanium dioxide containing from about 0.3 to about 0.75 weight percent co-oxidized silica and from about 1 to about 2.5 weight percent co-oxidized alumina, which comprises the steps of (a) coating such pigmentary titanium dioxide with at least 0.05 weight percent of the metal oxide of aluminum, zinc or zirconium, (b) heating such metal oxide coated pigment at from about 500° C. to about 750° C. for from about 10 minutes to about 5 hours, and (c) coating the heat treated pigment with at least one member selected from the group consisting of the hydrous metal oxides of aluminum, silicon, zirconium and titanium.

9. A method according to claim 8 wherein the metal oxide coating applied in step (a) is present in amounts of from about 0.1 to about 5 weight percent.

10. A method according to claim 8 wherein the metal oxide coated pigment is heated at from about 600° C. to about 650° C. for from about 20 to 30 minutes.

11. A method according to claim 8 wherein the heat treated pigment is coated with from about 2 to about 20 weight percent, based on titanium dioxide, of the hydrous metal oxides of aluminum and silicon.

12. A method according to claim 8 wherein the total amount of hydrous metal oxide coating placed on the pigment in step (c) is from about 2 to about 20 weight percent, based on titanium dioxide.

13. Pigmentary titanium dioxide having a metal oxide coating consisting essentially of at least 0.05 weight percent zirconium oxide, which coating has been heated at from about 500° C. to about 750° C. for from about 10 minutes to about 5 hours, and on which coating is superposed a dried hydrous metal oxide coating of at least one member selected from the group consisting of the hydrous metal oxides of aluminum, silicon, zirconium and titanium, the total amount of such hydrous metal oxide being from about 2 to about 20 weight percent, based on TiO$_2$.

14. Pigmentary titanium dioxide according to claim 13 which contains from about 1 to about 2.5 weight percent co-reacted alumina and from about 0.3 to about 0.75 weight percent co-reacted silica.

15. Pigmentary titanium dioxide according to claim 13 wherein said zirconium oxide coating ranges from about 0.1 to about 5 weight percent, based on TiO$_2$.

16. Pigmentary titanium dioxide having a metal oxide coating consisting essentially of from 0.1 to about 5 weight percent of zirconium oxide, which coating has been heated at from about 600° C. to about 650° C. for from about 20 to 30 minutes and on which coating is superimposed from about 2 to about 20 weight percent of a hydrous metal oxide coating of alumina and silica, the weight percent ratio of alumina to silica, each based on TiO$_2$, ranging from 1:3 to 3:1.

17. Pigmentary titanium dioxide containing from about 1 to about 2.5 weight percent co-reacted alumina and from about 0.3 to about 0.75 weight percent co-reacted silica and having a metal oxide coating consisting essentially of from about 0.1 to about 5 weight percent of aluminum oxide, zinc oxide or zirconium oxide, which coating has been heated at from about 500° C. to about 750° C. for from about 10 minutes to about 5 hours 5 on which coating is superposed a dried hydrous metal oxide coating of at least one member selected from the group consisting of the hydrous metal oxides of aluminum, silicon, zirconium and titanium, the total amount of such hydrous metal oxide being from about 2 to about 20 weight percent, based on TiO$_2$.

* * * * *